Feb. 25, 1947.  S. BLENDEN  2,416,568
PARACHUTE LOAD RELEASE
Filed July 13, 1946  3 Sheets-Sheet 1
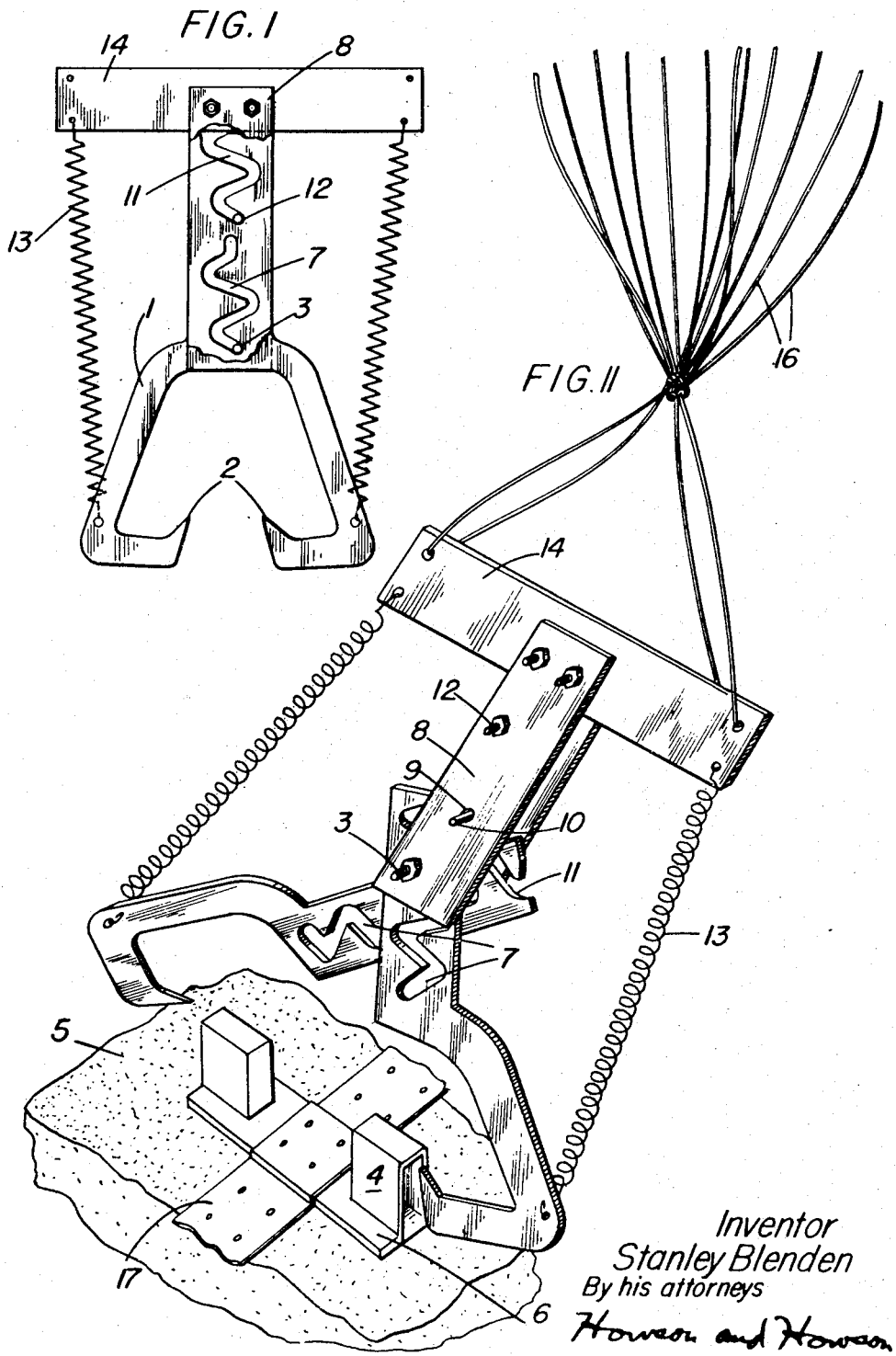
Inventor
Stanley Blenden
By his attorneys
Howson and Howson Feb. 25, 1947. S. BLENDEN 2,416,568
PARACHUTE LOAD RELEASE
Filed July 13, 1946 3 Sheets-Sheet 2
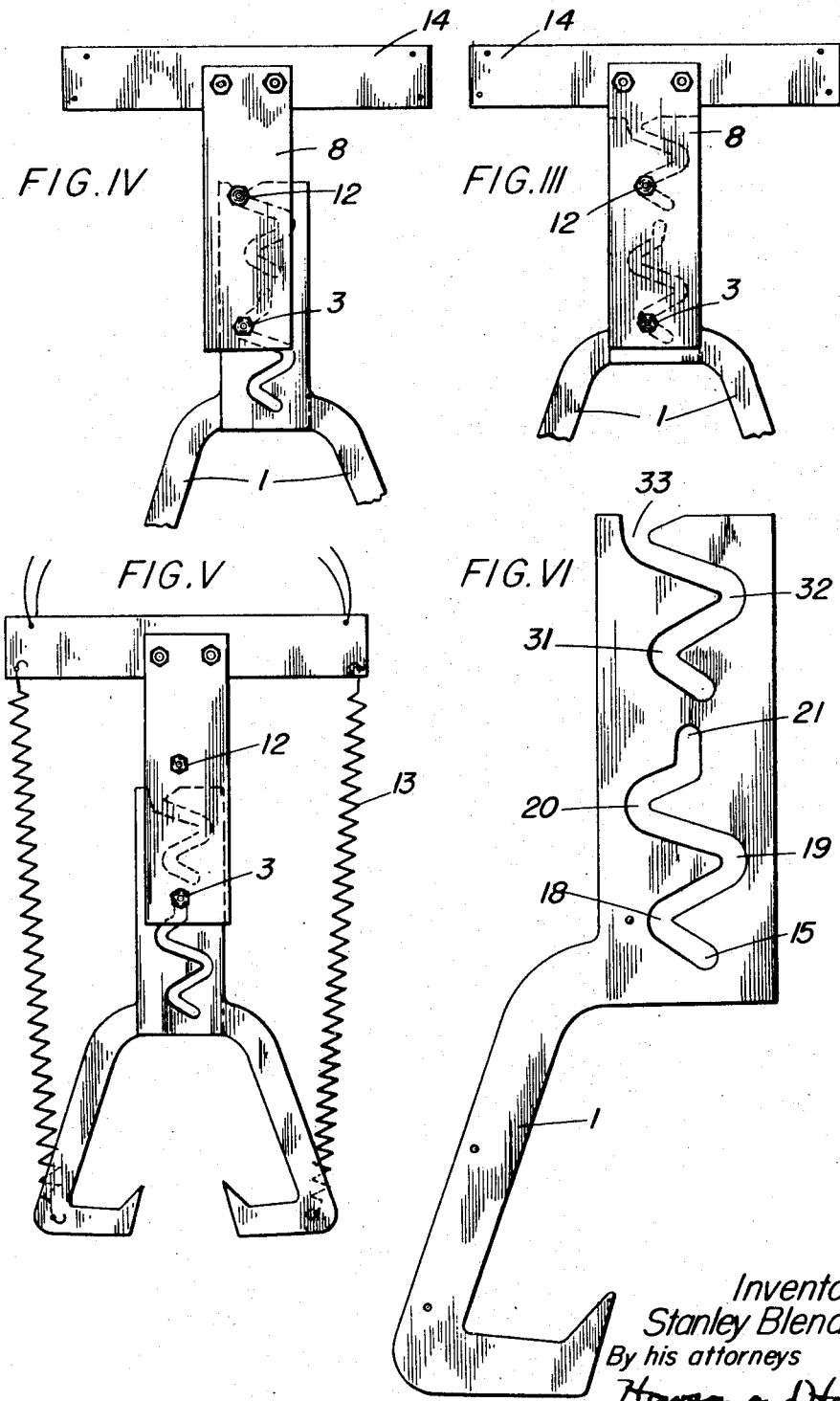
Inventor
Stanley Blenden
By his attorneys
Howson and Howson Feb. 25, 1947.  S. BLENDEN  2,416,568
PARACHUTE LOAD RELEASE
Filed July 13, 1946  3 Sheets-Sheet 3
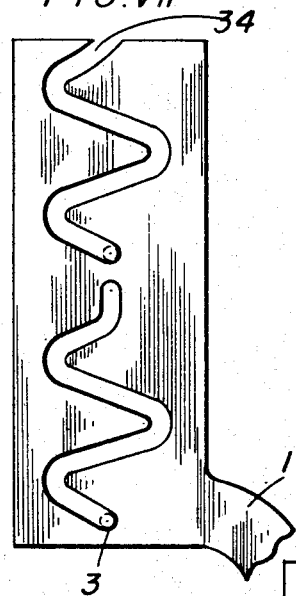
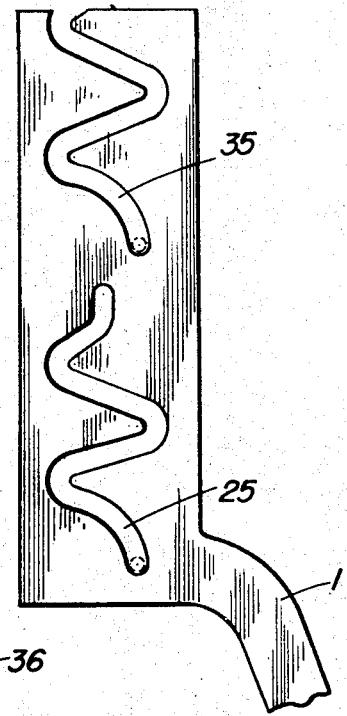
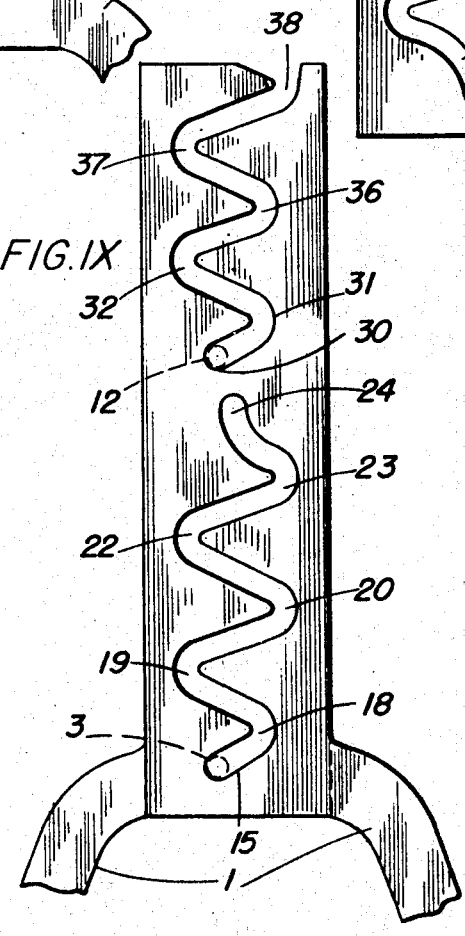
Inventor
Stanley Blenden
By his attorneys
Howson and Howson Patented Feb. 25, 1947

2,416,568

UNITED STATES PATENT OFFICE 2,416,568

PARACHUTE LOAD RELEASE

Stanley Blenden, Bradley Beach, N. J.

Application July 13, 1946, Serial No. 683,370

6 Claims. (Cl. 294—83)

This invention relates to mechanism for releasing an inanimate load from a parachute when it touches the ground. One of the principal uses of parachutes is to put down supplies, equipment, mail, food, etc., without landing the airborne craft. One of the main difficulties heretofore encountered in this operation has been the fact that after a parachute carrying an inanimate load reaches the group, the wind frequently causes the parachute to drag the load along the ground, with damage to the load. The object of this invention is to prevent the load from being dragged along the ground by the parachute after landing. I have devised a simple and improved form of mechanism adapted to cause detachment of the load as soon as it touches the ground.

In my invention there is a release mechanism containing a pair of pivotally mounted arms which grasp the load between them, and spring means weaker than the effective weight of the load tending to pull the arms apart. It is one characteristic of my invention that there are zig zag paths or slots in the arms which keep the arms in safety position gripping the load until the parachute has passeg through the no load condition and is descending smoothly with the full weight of the load on the parachute.

In the drawings:

Figure 1 is a side elevation of one embodiment of my novel release mechanism in safety position before it has taken the weight of the load, part of the mechanism being shown broken away to make clear the relation of the parts;

Figure 2 is a perspective view of the novel release mechanism of Fig. 1, showing the release mechanism and the shroud of the parachute just after the load has touched the ground, the arms are being shown swung out to release position;

Figure 3 is a view of the arms of my release mechanism showing the positions of the pins in the zig zag slots during the first "no load" condition;

Figure 4 is a view similar to Figure 3 showing the relations of the arm and pins after a second no load condition, if one should occur;

Figure 5 is a view similar to Figures 3 and 4 showing the relations of the arms and the pins when the device is descending smoothly after the no load conditions have been passed with the arms ready to release the load;

Figure 6 is an enlarged view of one of the arms of Figs. 1 to 5 showing the zig zag slots more clearly;

Figure 7 is a view on the scale of Figure 6 of the upper part of an arm in which the zig zag paths have been modified slightly by giving one more segment to the upper path;

Figure 8 is a view similar to Figure 7 showing zig zag paths somewhat similar to Figure 6 but with the paths curved somewhat for the purpose described below;

Figure 9 is a view somewhat similar to Figs. 6, 7 and 8 showing the zig zag paths in a pair of arms where the zig zag paths have more segments than in those shown in Figures 1 to 8.

In order to provide a satisfactory mechanism for release of a load from a parachute where the load is an inanimate object which cannot detach itself or control the action of the parachute after landing, it is necessary, in the first place, that there be mechanism which will keep the parachute attached to the load while the parachute is in the airplane and also in the air. In order to keep the mechanism from releasing the load before it is thrown out of the airplane, I provide means which keep the load-gripping elements in load-gripping position until the parachute is carrying the full weight of the load after it has been thrown out of the plane, and after the parachute has passed through the various no load condition in the air and is descending smoothly.

The central feature of my mechanism is a pair of jaws or arms I acting in the manner of tongs. They are pivotally mounted together, i. e., at the same point, and they have their inner points 2 shaped so as to engage the objects to be held. The pivot screw or pin 3 and its sleeve being central and the points 2 of the arms somewhat separated, the weight of the load will force the arms together. In the construction shown in Fig. 2, the points 2 of the arms are inserted into enclosures such as tubes 4 fastened to the load 5 at a reverse angle and slightly separated, so that considerable movement of the arms against the weight of the load is necessary to effect release of the load. The amount of movement necessary to effect such release would not occur accidentally, under actual practice. The tubes 4 are carried on a U-shaped bracket 6.

In the embodiment of Fig. 2, the bracket 6 is riveted to a strap 17 extending around the load, which strap can be fastened to the load by screws or any other desired means.

The two arms I between which the load is grasped are pivoted about a point on the vertical median line of the mechanism corresponding to the pivot screw 3, and the upper ends of the arms overlap and coincide along this line as long as the arms I have not released the load. These upper ends are shown in the "safety" position in Fig. 1. It will be observed that the upper end of each arm above the pivot point has two slots in it. One slot 7 is a closed one extending upwardly from the bend where the arm turns outwardly, and when in the safety position the pivot screw 3 and its sleeve lie at the lower end of the slot in each arm. The upper ends of the arms lie between vertical side plate elements 8 in which the screw 3 is mounted. As an extra safety device, I have provided holes 9 through the above-mentioned suspension side plates 8 which are in registry with this closed slot at the upper end thereof when the device is in safety position. It is obvious that by inserting a pin 10 in this hole the device is locked in safety position and the load therefore cannot possibly be released, even manually, until the pin is withdrawn Figure 2. Any desired means can be provided for causing withdrawal of the pin 10 when the parachute is ready to be thrown out.

The second slot 11 in each arm is an open-end one at the upper end of the arm, extending longitudinally of the upper end in the same directions as the closed slot previously described. A second screw or pin 12 in line with the first one is mounted in the two side plates 8 and passes between them. This screw and its sleeve lie in open slots 11 in the upper ends of the arms. The screw and slots are so located as to hold the two arms from pivoting about the pivot screw 3 until the arms attached to the load have been pulled out, as, for example, by the weight of gravity all the way from the safety to the "ready" position. The position of the parts after having been pulled out to the "ready" position is shown in Fig. 5. This is the position of the parts when the parachute is descending smoothly after having passed through any period of "no load" as the mechanism is becoming adjusted after leaving the plane.

When a parachute is thrown out of a plane it descends rapidly until the parachute opens out and fills with air. This occurs within a couple of seconds after the parachute is released and brings the rapid descent of the load to an end with a sharp jerk. Immediately after this jerk there is a moment when the load exerts no downward pull on the parachute. This is known as a "no load" condition. In order to prevent the sudden jerk caused by the opening of the parachute pulling the pins 3, 12 out of the slots 7 and 11 to the ready position thereby causing release of the load, I have provided a novel form of slot which retards pulling out of the arm to the ready position until after all the "no load" conditions have occurred. One basic thought in these novel slots is their devious or zig zag character and I will first describe the embodiment shown most clearly in Fig. 6 and which is shown in operation in the preceding figures. Both the closed slot 7 in which the pivot pin 3 moves and the open slot 11 in which the registry screw 12 moves have this zig zag formation. These zig zag slots of course are formed in each arm and when the two arms are assembled in the mechanism in operating relation the corresponding segments of the two arms are in exact registry with each other. Each slot pursues a devious path rather than a straight one. It therefore includes a plurality of changes of direction and may be all curved or a combination of curved and straight portions. In Fig. 6 each slot comprises successive segments going laterally in opposite directions in the upper end of its arm, there being a sharp curve or angle where each segment joins the next one. The arm shown in Fig. 6 is the lower of the two arms in Figs. 3 and 4 i. e. the arm whose lower end appears at the left of Figs. 3 and 4. It will be seen that if the upper arm were placed over the lower arm with the lower parts of the arms in registry with each other the slots would proceed in direction opposed to each other. It follows from the above mentioned facts that the slots must be in registry with each other when the two arms are assembled in operating relation with their points 2 facing inwardly toward each other. When the arms are in the safety position shown in Fig. 1 the pivot pin 3 will rest at the lower end 15 of the closed slot and the registry pin 12 will rest in the lower end 30 of the upper or lower slot. As shown in Fig. 6 there is a short segment of each slot starting to the left. Here each slot forms an angle 18 or 31 respectively. It next turns and moves to the right to the corners 19 and 32.

At these angles 19 and 32 the two slots turn left again extending to the left preferably a distance slightly beyond the angles 18 and 31 where angles 20 and 33 are formed. It will be noted that in the embodiment shown in Figure 6 the segments 15—18, 18—19, 19—20, 30—31, 31—32, 32—33, thus far described are each a straight line. The lower or closed slot then projects upwardly from the angle 20 toward the middle of the arm and then turns sharply upward to the end 21 of the slot. The upper or open slot turns to the right at the angle 33 similarly to the angle 20 of the lower slot but at this point reaches the upper end of the arm and terminates in the opening which releases the registry screw 12 when the slot gets up to that point.

The jerk caused by the first filling of the parachute with air pulls the two arms 1 downwardly and partly out of the frame and the pin 3 and 12 move up their slots to the angles 18 and 31. At this point the abrupt changes in direction of more than 90° interrupt the passage of the pins upwardly in the slot and the pins generally go no further. If by chance they do turn the angles 18 and 31 they will definitely be stopped at the angles 19 and 32. At this moment the "no load" condition occurs. Because of this fact two things occur. In the first place the registry screw 12 not having come out of the open upper end of its slot the mechanism will not release the load in spite of the momentary no load condition. In the second place the springs 13 are strong enough owing to that momentary no load condition to pull the arms upwardly again until the pins are respectively at the angles 18 and 31. When the no load condition ceases the even pull of the load will tend to cause the arms to zig zag downwardly and the screws will move upwardly again to the angles 19 and 32. If there is a slight reflex action from the first no load condition it will be merely a second but smaller no load condition and the spring 13 will again tend to pull the arms upwardly. This moves the screws back to the points 18 and 31. Continued descent of the parachute will permit the smooth pull of the load time to draw the arms outwardly until the registry screw 12 clears the angle 33 and the device is in the "ready" position.

The amount of delaying action necessary in the zig zag slot of my invention will vary in accordance with a number of factors. Examples of such factors are the height at which the load is thrown off the plane, the weight of the load etc. In Figs. 7, 8 and 9, therefore, I have shown various modified forms of slots which tend to increase the hold-back or retarding action of the slot. In Fig. 7 the upper or open slot for the registry screw 12 is extended upwardly slightly to give a short segment 34 above the angle 33 shown in Fig. 6. With this arrangement if a second no load condition occurs after the pins reach the angle 20 and 33 respectively there would be double assurance that the load would not be released. In Fig. 8 it will be noticed that the lowermost segments of the slots—namely segment 25 of the closed or lower slot and the segment 35 of the upper or open slot, are curved generally throughout their length. This will tend to retard the movement of the pins upwardly to the first angle when the force tending to move the pins is a momentary jerk as in the case of the condition just preceding the initial no load condition.

The construction of Fig. 9 adds additional zig zag segments to both slots which is an added safety measure that may be of advantage when the load is being dropped from a height of say more than a 1000 feet. In this view the arms are being viewed from the opposite side to that shown in Figs. 6, 7 and 8 so that the segments move in a direction opposite to that of three figures. The pivot pin 3 and the registry pin 12 are shown in the lower ends of their slots in dotted lines the lower ends being indicated by the reference characters 15 and 30 respectively. The slots have short segments moving to the right to the angles 18 and 31 then left to the angles to 19 and 32 and then right to the angles 20 and 36 as heretofore. The added segments comprise the segments from angle 20 to angle 23 and similarly from 23 to 24 in the lower slot and from 36 to 37 and from 37 to 38 in the upper slot. All these segments have been shown straight except the segment 23—24 which is shown curved. It will be obvious that the angles could be more acute to slow down movement of the jaws. They also could be made less acute to accelerate the downward movement of the jaws, combinations of curved and straight segments can be used to provide quick movement of the arms at certain portions in their travel and slow movements at other portions.

Turning now to the elements which cooperate to cause release of the load as it contacts the ground, attention is called to the tension springs 13. There is a cross bar 14 at the upper end of the release mechanism extending laterally beyond the vertical side elements 8. This bar and the side elements 8 constitute the frame of the mechanism. One of these tension springs 13 is fastened to each end of the cross bar 14, preferably at a point laterally beyond the point of attachment of the lower end of the spring to the load-carrying arm 1. The effective strength of these springs is calculated so as to be less than the effective weight of the proposed load due to gravity, as the load is falling. For this reason the spring cannot pull the arms out of load-carrying position while the parachute is descending except during "no load condition."

Experience has shown that even if there is considerable wind, when a parachute 15 carrying an inanimate load reaches the ground there is a short perior of time as the load hits the ground when the parachute is not pulling on the load. This is sometimes called the "dip." I take advantage of this "dip" to cause release of the parachute from the load. During the "dip," the shrouds 16 are relaxed, and the load is not pulling downwardly on the arms. The relation of the parts just as the "dip" takes place is shown in Fig. 2. As the loss of weight becomes effective through the "dip," the two tension springs 13 are no longer opposed by the weight and pull the arms 1 laterally outward from engagement in the tubes 4, as shown in Fig. 2. In this way the connection between the parachute and the load is completely destroyed, and as the parachute is carried away by the wind it will not carry the load along, and damaging of the load is thereby prevented.

It will be seen that my mechanism is characterized by safety and simplicity.

I claim:

1. A parachute load release comprising a pair of arms to grasp the load and having slots therein which take a path including a plurality of changes of direction, a frame, a pivot in the frame passing through a slot in each arm whereby the arms can be pulled out with relation to the frame by the weight of the load, and spring means tending to cause the arm to pivot and release the load when relieved of its weight, in combination with means on the frame restraining the arms against releasing the load except when the arms have been pulled out, the devious nature of slots delaying the arms pulling out, for the purpose described.

2. A parachute load release comprising a frame, a pair of arms adapted to grasp the load between them, there being zig-zag slots in the arms, spring means tending to cause the arms to release the load when relieved of its weight and means restraining the arms against responding to the spring pressure, in combination with a pivot in the frame passing through a slot in each arm, the zig zag slots permitting the arms to move beyond the restraining means only when the arms have carried the weight of the load for the desired period of time.

3. A parachute load release according to claim 1, in which the restraining means comprise a pin on the frame lying in a slot in each arm having an open upper end, the pin being clear of the open slots in the arms when the latter are pulled out by the weight of the load whereby the arms fly apart when relieved of the load after carrying the weight for the desired period of time.

4. A parachute load release according to claim 1, in which there are two slots in each arm, a closed slot for the pivot and a slot open at the top of the arm for the restraining means, the slots in the two arms registering with each other while the arms are grasping the load.

5. A parachute load release according to claim 2, in which the spring means are of such that they tend to retract the arms into the frame during any no load condition.

6. A parachute load release mechanism comprising a frame, a pair of arms adapted to grasp the load between them, said arms having closed slots and open slots in their upper ends lying in the frame, a pin in the frame passing through the closed slots and holding them in registry with each other whereby the arms can pivot about said pin, the arms moving longitudinally relatively to said pivot pin in taking the weight of the load, and spring means weaker than the weight of the load and tending to pull the arms apart, effective when the arms are relieved of the load, in combination with a registry pin adapted to lie in the open slots in the arms and hold the arms in load-engaging position when they are in non-load-carrying position, said registry pin being clear of the open slots in the arms when the latter move to the "ready" position, whereby the arms fly apart when relieved of the load after having been pulled out to "ready" position.

STANLEY BLENDEN.